US008257226B2

(12) United States Patent
Reynolds

(10) Patent No.: US 8,257,226 B2
(45) Date of Patent: Sep. 4, 2012

(54) VARIABLE SPEED DRIVETRAIN FOR ELECTRONIC THROTTLE BODY

(75) Inventor: Brian Reynolds, Plain City, OH (US)

(73) Assignee: Honda Motor Co., Ltd., Tokyo (JP)

(*) Notice: Subject to any disclaimer, the term of this patent is extended or adjusted under 35 U.S.C. 154(b) by 1086 days.

(21) Appl. No.: 12/172,833

(22) Filed: Jul. 14, 2008

(65) Prior Publication Data

US 2010/0009804 A1 Jan. 14, 2010

(51) Int. Cl.
*B60K 31/02* (2006.01)

(52) U.S. Cl. .................... 477/107; 123/339.25; 123/376

(58) Field of Classification Search .................. 123/376, 123/339.25, 339.26; 477/107

See application file for complete search history.

(56) References Cited

U.S. PATENT DOCUMENTS 3,794,293 A * 2/1974 Matuda et al. ........... 251/129.03
4,411,231 A 10/1983 Watanabe et al.
4,526,060 A 7/1985 Watanabe
5,060,744 A * 10/1991 Katoh et al. .................. 180/178

FOREIGN PATENT DOCUMENTS

JP 04-203327 7/1992
JP 04-301145 10/1992

* cited by examiner

*Primary Examiner* — Sherry Estremsky
(74) *Attorney, Agent, or Firm* — Plumsea Law Group, LLC

(57) ABSTRACT

A variable speed drivetrain for an electronic throttle body is disclosed. The system includes a gear arrangement for the drivetrain of the electronic throttle body that includes a driving gear, a set of driven gears and a set of intermediate gears. The system also includes a clutch that is configured to selectively engage with one of the driven gears according to the selected mode of operation.

20 Claims, 5 Drawing Sheets

VARIABLE SPEED DRIVETRAIN FOR ELECTRONIC THROTTLE BODY

BACKGROUND OF THE INVENTION

1. Field of the Invention

The present invention relates to motor vehicles and in particular to a method and apparatus for controlling a drivetrain for an electronic throttle body.

2. Description of Related Art

Methods of providing differing gear ratios for operating a throttle body have been previously proposed. Watanabe (U.S. Pat. No. 4,526,060) teaches a carburetor throttle valve actuator. Watanabe teaches a throttle valve actuator that is automatically moved within two ranges to provide idle speed control and vehicle speed control. The movement mechanism of the Watanabe design includes a compound planetary gear set.

Fukushima (Japanese patent number 04-203327) teaches a throttle control device. Fukushima teaches a motor to drive a throttle valve shaft. A deceleration mechanism is provided to transmit the rotation of the motor to the throttle valve shaft. The deceleration mechanism includes a driving small gear, a driven large gear and a driving large gear and a driven small gear.

SUMMARY OF THE INVENTION

A method for controlling a throttle is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to, cars, trucks, vans, minivans, SUVs, motorcycles, scooters, boats, personal watercraft, aircraft and ATVs.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or a fuel cell is converted into rotational kinetic energy or where electrical potential energy is converted into rotational kinetic energy. Engines can also include provisions for converting kinetic energy into potential energy; for example, some engines include regenerative braking systems where kinetic energy from a drivetrain is converted into potential energy. Engines can also include devices that convert solar or nuclear energy into another form of energy. Some examples of engines include, but are not limited to, internal combustion engines, electric motors, solar energy converters, turbines, nuclear power plants, and hybrid systems that combine two or more different types of energy conversion processes.

In one aspect, the invention provides a throttle valve control system, comprising: a motor attached to a motor shaft and configured to rotate the motor shaft; a driving gear engaged with the motor shaft; an intermediate gear set configured to engage the driving gear configured to rotate about an intermediate shaft; a first driven gear engaging the intermediate gear set and a second driven gear engaging the intermediate gear set; and where a throttle shaft attached to a throttle valve is selectively engaged with either the first driven gear or the second driven gear.

In another aspect, the driving gear, the first driven gear and at least one gear from the intermediate gear set are associated with a first gear path configured to transfer power between the motor shaft and the throttle shaft.

In another aspect, the first gear path is associated with a first gear ratio.

In another aspect, the driving gear, the second driven gear and at least one gear from the intermediate gear set are associated with a second gear path configured to transfer power between the motor shaft and the throttle shaft.

In another aspect, the second gear path is associated with a second gear ratio.

In another aspect, the first gear ratio is greater than the second gear ratio.

In another aspect, the first driven gear is selectively engaged with the throttle shaft when the throttle valve control system is operating in a normal mode associated with high engine load conditions.

In another aspect, the second driven gear is selectively engaged with the throttle shaft when the throttle valve is operating in a high accuracy mode.

In another aspect, the selective engagement with either the first driven gear or the second driven gear is achieved using a clutch plate.

In another aspect, the clutch plate is configured to slide along the throttle shaft between the first driven gear and the second driven gear.

In another aspect, the movement of the clutch plate is accomplished using a spring and an electromagnet.

In another aspect, the clutch plate is engaged with the first driven gear when the spring is in a default position and the electromagnet is inactive.

In another aspect, the clutch plate is engaged with the second driven gear when the spring is in an engaged position and the electromagnet is active.

In another aspect, the invention provides a throttle valve control system, comprising: a motor attached to a motor shaft and configured to rotate the motor shaft; a driving gear engaged with the motor shaft; an intermediate gear set configured to engage the driving gear and configured to rotate about an intermediate shaft; a first driven gear and a second driven gear that are engaged with the intermediate gear set and that may be selectively engaged with a throttle shaft, the throttle shaft being configured to rotate a throttle valve; and where the intermediate gear set comprises a first intermediate gear configured to engage with the first driven gear, a second intermediate gear configured to engage with the second driven gear and a third intermediate gear configured to engage with the driving gear.

In another aspect, the first intermediate gear has a first diameter that is smaller than a second diameter of the second intermediate gear.

In another aspect, the third intermediate gear has a third diameter that is larger than the first diameter of the first intermediate gear and the second diameter of the second intermediate gear.

In another aspect, the first driven gear has a first diameter that is greater than a second diameter of the second driven gear.

In another aspect, the invention provides a method of operating a throttle valve control system, comprising the steps of: receiving information related to engine conditions; determining if an engine is operating in a condition that requires precise control of a throttle; selectively engaging a first driven gear if the engine is operating in a normal condition; and selectively engaging a second driven gear if the engine is operating in the condition that requires precise control of the throttle.

In another aspect, the step of engaging the second driven gear further includes the step of activating an electromagnet to move a clutch plate.

In another aspect, the first driven gear is engaged by the clutch whenever the electromagnet is not activated.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
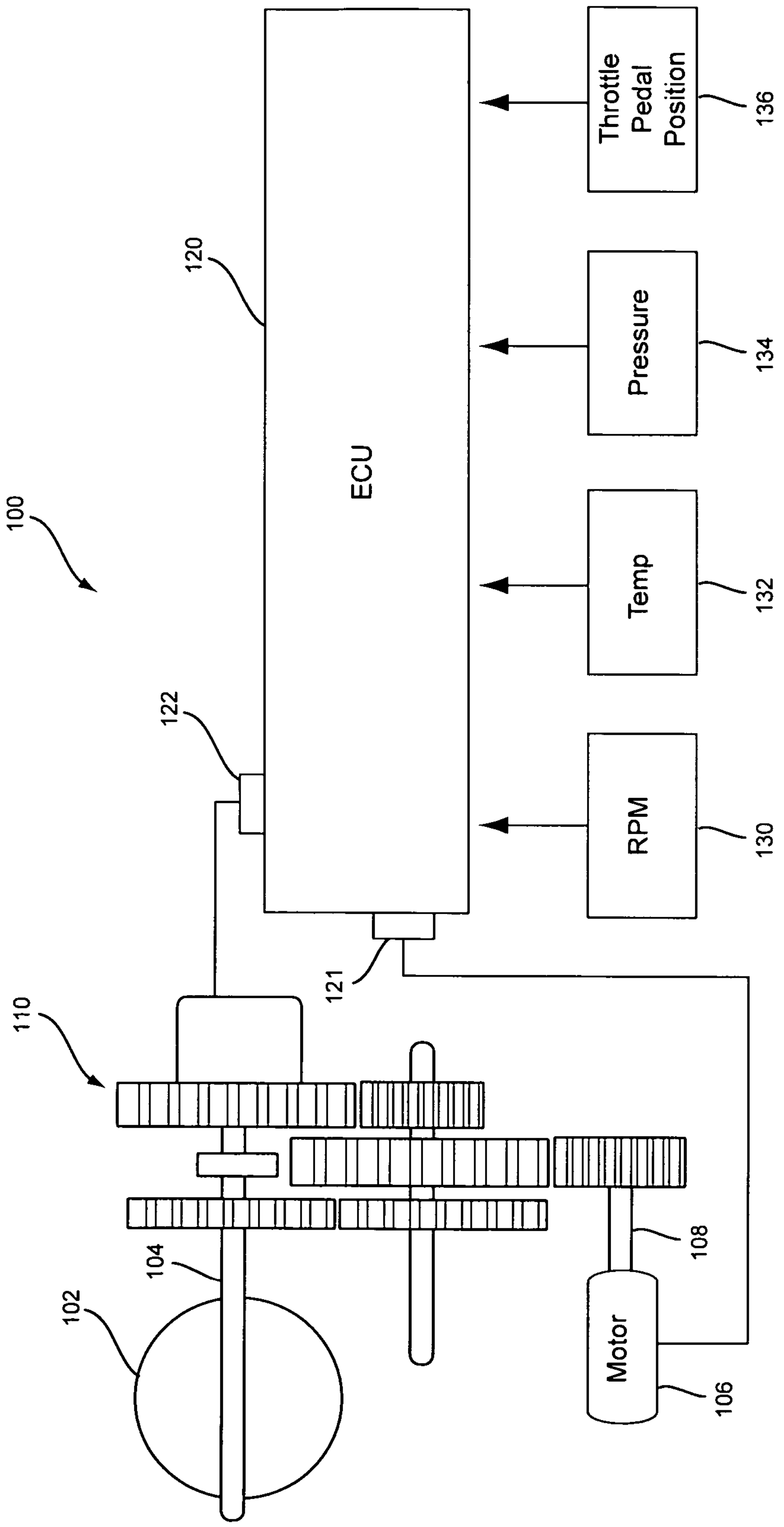
FIG. 1 is a schematic view of a preferred embodiment of a throttle valve control system.

FIG. 1 is a schematic view of throttle valve control system 100. Generally, throttle valve control system 100 could be associated with any type of motor vehicle. For purposes of clarity, only some components of a motor vehicle are shown in the current embodiment. It should be understood, however, that the components of throttle valve control system 100 are preferably associated with other components of a motor vehicle, including an engine, as well as other components and/or systems necessary for the motor vehicle to operate properly.

Throttle valve control system 100 preferably includes throttle valve 102. Typically, throttle valve 102 may be associated with an intake manifold of an engine. In particular, throttle valve 102 may be opened and closed in order to control the flow of air into the intake manifold. For purposes of illustration, throttle valve 102 is shown in isolation in the Figures.

Generally, throttle valve 102 could be any type of valve. Examples of various types of valves include, but are not limited to, ball valves, butterfly valves, choke valves, check valves, gate valves, globe valves, as well as other types of valves. In a preferred embodiment, throttle valve 102 is a butterfly valve. Furthermore, throttle valve 102 could be any type of butterfly valve, including, but not limited to, resilient butterfly valves, high performance butterfly valves, tri-centric butterfly valves, water style butterfly valves, lug style butterfly valves, as well as other types of butterfly valves.

In some embodiments, throttle valve 102 may be mounted to throttle shaft 104. In some cases, throttle valve 102 may be integrally formed with throttle shaft 104. In other cases, throttle valve 102 may be attached to throttle shaft 104 using any known method. In a preferred embodiment, throttle valve 102 is configured to rotate as throttle shaft 104 rotates. With this configuration, throttle valve 102 can be operated between open and closed positions by rotating throttle shaft 104.

Throttle valve control system 100 may also be associated with motor 106. In some embodiments, motor 106 may be an electric motor. Examples of different types of electric motors include, but are not limited to, DC motors, universal motors, AC motors, torque motors, slip ring motors, stepper motors, as well as other types of motors. In a preferred embodiment, motor 106 is a stepper motor.

Motor 106 may be configured to drive throttle valve 102. In some embodiments, motor 106 could be directly connected to throttle shaft 104. In other embodiments, motor 106 could be connected to another component that is configured to transmit power from motor 106 to throttle shaft 104. In some cases, motor 106 and throttle shaft 104 could be connected to a component configured to modify the power transferred from motor 106 to throttle shaft 104.

In one embodiment, throttle valve control system 100 may include gear train system 110. Generally, gear train system 110 may be any type of gear train. Examples of various types of gear trains include, but are not limited to, simple gear trains, compound gear trains, epicyclic (planetary) gear trains and reverted gear trains, as well as other types of gear trains. In a preferred embodiment, gear train system 110 is a compound gear train.

In this embodiment, motor 106 may be connected directly to motor shaft 108 at a first end of motor shaft 108. A second end of motor shaft 108 may be connected to gear train system 110. Additionally, throttle shaft 104 may also be attached to gear train system 110. Details of this arrangement are discussed in detail below. With this preferred arrangement, motor 106 may be used to drive gear train system 110, which further transmits power and rotates throttle shaft 104 and throttle valve 102. This provides a system for opening and closing throttle valve 102 via power generated at motor 106.

Throttle valve control system 100 preferably includes provisions for controlling motor 106. In some embodiments, a drive-by-wire system may be used to automatically adjust a throttle according to information received at an electronic control unit of the motor vehicle. The term "drive-by-wire system" refers to any system for controlling a throttle using electrical signals in addition to, or instead of, mechanical connections typically used to control a throttle when a driver depresses a throttle pedal of the motor vehicle. Using a drive-by-wire system, the electronic control unit may receive information from a throttle pedal, as well as additional information to determine how to control the throttle. A control signal generated by the electronic control unit may then be transmitted to a motor that controls the opening and closing of a throttle valve.

In some embodiments, throttle valve control system 100 may include electronic control unit 120, hereby referred to as ECU 120. In some embodiments, ECU 120 may be a computer or similar device associated with a motor vehicle. Preferably, ECU 120 may be configured to communicate with, and/or control various components of a motor vehicle, including components of throttle valve control system 100.

ECU 120 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In one embodiment, ECU 120 may be in communication with motor 106. In particular, ECU 120 may include first port 121 that is configured to transmit and/or receive information from motor 106. With this arrangement, ECU 120 may be configured to transmit control signals to motor 106. In some cases, ECU 120 may also provide power to motor 106 via first port 121 or another port.

ECU 120 may also communicate with gear train system 110. In some cases, gear train system 110 may be adjustable, including clutches or other provisions for adjusting gear ratios. Preferably, gear train system 110 may be adjusted using electric signals. In this exemplary embodiment, ECU 120 may include second port 122 that is configured to transmit and/or receive information from gear train system 110. With this arrangement, ECU 120 may transmit control signals to gear train system 110 to activate one or more clutches associated with gear train system 110, for example.

ECU 120 preferably includes provisions for receiving information related to conditions of an engine or other components of a motor vehicle. In some cases, ECU 120 could receive information from a throttle pedal. In other cases, ECU 120 could receive information related to various engine parameters including, but not limited to, engine speed, engine temperature, intake manifold pressure, as well as other parameters. These various parameters may be useful for computing a throttle opening value.

In one embodiment, ECU 120 may be configured to receive information related to engine speed 130, engine temperature 132, intake manifold pressure 134 and throttle pedal position 136. Generally, these parameters may be received from, or determined from information received from, various sensing systems. For example, engine speed 130 could be determined from information received from a crank angle sensor. Likewise, engine temperature 132 and intake manifold pressure 134 could be determined from information received by a temperature sensor and manifold pressure sensor, respectively. Finally, throttle pedal position 136 could be determined from information received from a throttle position sensor, as is used in some drive-by-wire systems.

For purposes of clarity, only four input parameters are discussed in this embodiment. In other embodiments, however, various other parameters from an engine or another system of a motor vehicle could be received by ECU 120. For example, in an alternative embodiment, ECU 120 could also receive information related to a current vehicle speed. In some cases, this information could also be used to determine a throttle opening value.

In order to increase engine power, some throttle valve systems use throttle valves with increased diameters. However, as the throttle plate diameter increases, air flow at idle becomes more difficult to control because the resolution of the electric motor is too large. In some cases, the inclusion of provisions for changing the speed of the gear train system that directs power between the motor and the throttle valve may be desirable. This arrangement allows for one speed of the throttle valve control system that is optimized for normal operation of the engine, while a second speed is optimized for engine conditions requiring more precise control of the throttle. For example, the second speed may be used when the engine is idling.

Figure 2:
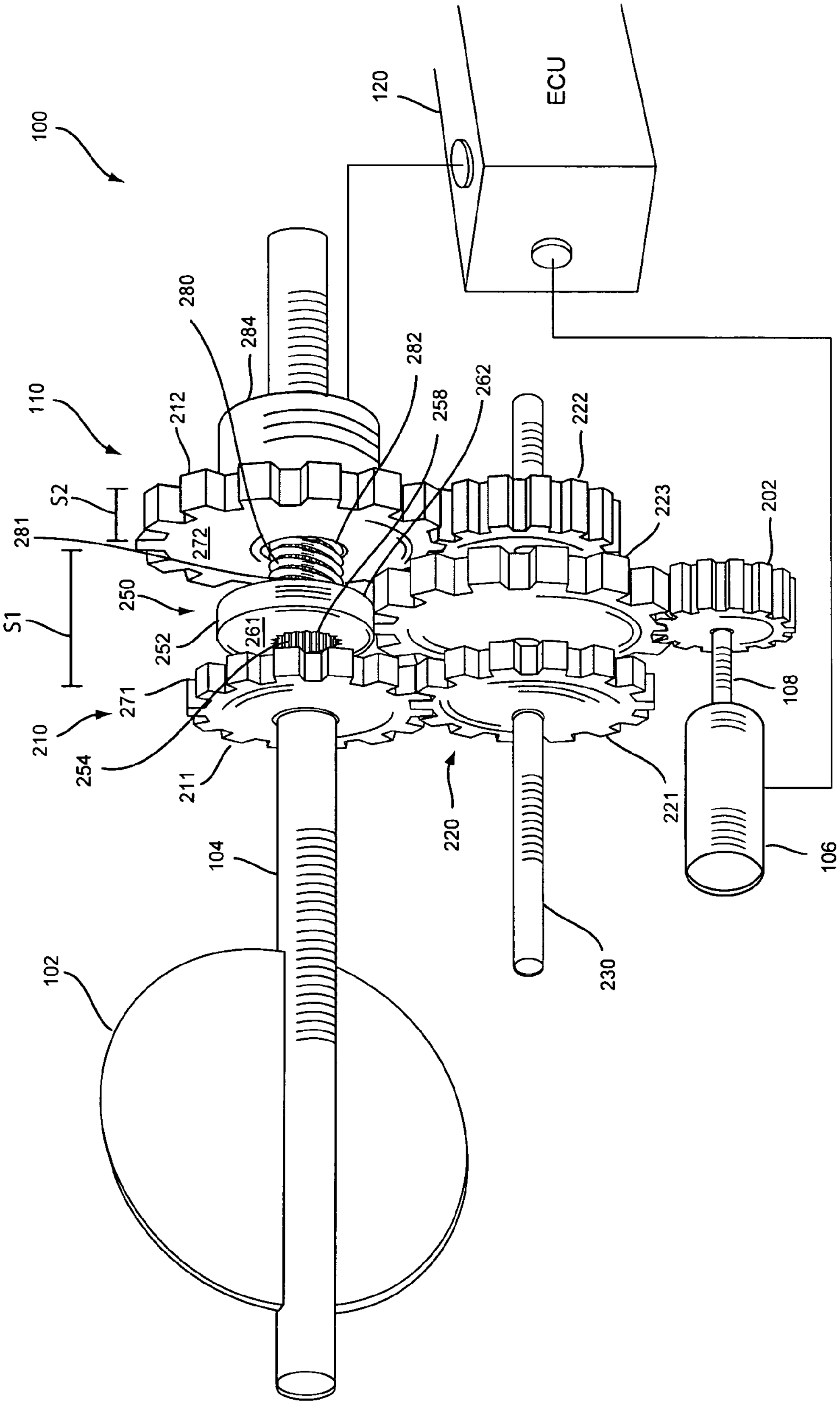
FIG. 2 is an isometric view of a preferred embodiment of a throttle valve control system.

Referring to FIG. 2, gear train system 110 preferably includes multiple sets of gears that can be operated to yield differing gear ratios. In some embodiments, gear train system 110 may include a set of driving gears associated with motor shaft 108. Additionally, in some embodiments, gear train system 110 may include a set of driven gears associated with throttle shaft 104. In some cases, gear train system 110 may further include a set of intermediate gears configured to rotate around an intermediate shaft.

Generally, the gears used in gear train system 110 may be any type of gears. Examples of types of gears include, but are not limited to, spur gears, helical gears, double helical gears, bevel gears, crown gears, as well as other types of gears. In some embodiments, each of the gears may be a different type of gear as long as the teeth associated with each gear are configured to engage or mesh together. Additionally, in the embodiments discussed in this detailed description, the entire circumference of a gear may include teeth, or only a portion of the circumference of the gear may include teeth.

In the following exemplary embodiments, the gears are spur gears. However, in other embodiments, the gears could be any type of gear as discussed above. Additionally, the spacing of the teeth in the gears of these exemplary embodiments is wide for purposes of illustration. It should be understood, however, that the spacing may be modified in other embodiments. In particular, by decreasing the spacing between gears, gear train system 110 may provide for finer adjustment of throttle valve 102 in some cases.

In some embodiments, gear train system 110 may include driving gear 202. Driving gear 202 may be attached to motor shaft 108. In a preferred embodiment, driving gear 202 may be configured to rotate with motor shaft 108. This arrangement allows power from motor 106 to be input into gear train system 110 through driving gear 202.

Although the preferred embodiment includes a single driving gear, in other embodiments, gear train system 110 may include more than one driving gear. In some cases, gear train system 110 could include two or more driving gears of different diameters to increase available gear ratios of gear train system 110.

In some embodiments, gear train system 110 may include one or more intermediate gears, commonly referred to as idler gears. By using idler gears disposed between the driving gears and the driven gears, the direction of motion of the input shaft may be the same as the direction of motion of the output shaft. Furthermore, using idling gears allows for increased spacing between the driving gears and driven gears. This feature may be important for use with a throttle valve, since the motor must be spaced apart from the throttle valve, which is located in the intake manifold.

In some embodiments, gear train system 110 may include intermediate gear set 220. Intermediate gear set 220 may include first intermediate gear 221, second intermediate gear 222 and third intermediate gear 223. In this preferred embodiment, third intermediate gear 223 is a driven gear that is engaged with driving gear 202. Furthermore, first intermediate gear 221 and second intermediate gear 222 may be driving gears configured to engage with additional driven gears, as is discussed in further detail below.

Preferably, first intermediate gear 221, second intermediate gear 222 and third intermediate gear 223 are mounted on intermediate shaft 230. In some cases, some gears comprising intermediate gear set 220 are configured to rotate with intermediate shaft 230. In other cases, some gears of intermediate gear set 220 could be configured to selectively rotate with intermediate shaft 230, using a clutch or a similar provision. In this preferred embodiment, first intermediate gear 221, second intermediate gear 222 and third intermediate gear 223 are all configured to rotate with intermediate shaft 230.

Gear train system 110 preferably includes driven gear set 210. Driven gear set 210 may include first driven gear 211 and second driven gear 212. In some embodiments, first driven gear 211 and second driven gear 212 are associated with throttle shaft 104. Preferably, first driven gear 211 and second driven gear 212 are configured to rotate with throttle shaft 104. In some cases, gear train system 110 may include provisions for selectively engaging either first driven gear 211 or second driven gear 212 to rotate with throttle shaft 104. Details of this selective engagement are discussed below.

Generally, the number of gears associated with driven gear set 210 may vary. In some cases, only a single driven gear may be used. In other cases, driven gear set 210 may include more than two gears. In still other cases, using additional driven gears provides for increased variations in gear ratios of gear train system 110.

As previously discussed, gear train system 110 may include provisions for selectively engaging one or more driven gears of driven gear set 210. In this embodiment, gear train system 110 includes clutch assembly 250 that is configured to selectively connect one of the gears associated with driven gear set 210 with throttle shaft 104. Clutch assembly 250 could be associated with any type of clutch, including, but not limited to, a wet clutch, a dry clutch, a dog clutch, an overrunning clutch, a single plate clutch, a centrifugal clutch, a hydraulic clutch, an electromagnetic clutch, or any other type of clutch.

In this preferred embodiment, clutch assembly 250 includes clutch plate 252. Clutch plate 252 may be configured to slide along throttle shaft 104 between first driven gear 211 and second driven gear 212. Preferably, clutch plate 252 includes provisions for engaging first driven gear 211 and second driven gear 212. For example, if first side 261 of clutch plate 252 is pressed against first inner side 271 of first drive gear 211, clutch plate 252 may engage first driven gear 211. At this point, first driven gear 211 may rotate with clutch plate 252 and throttle shaft 104. Likewise, if second side 262 of clutch plate 252 is pressed against second inner side 272 of second driven gear 212, clutch plate 252 may engage second driven gear 212. This engagement preferably causes second driven gear 212 to rotate with clutch plate 252 and throttle shaft 104.

Generally, clutch assembly 250 may include any known provisions for providing a mechanical connection between throttle shaft 104 and clutch plate 252. In one embodiment, throttle shaft 104 may include splines 254 that are configured to engage a spline receiving grooves 258 of clutch plate 252. This arrangement may facilitate a mechanical connection between throttle shaft 104 and clutch plate 252. In other embodiments, other provisions for providing a mechanical connection between clutch plate 252 and throttle shaft 104 may be used.

Generally, clutch plate 252 may engage first driven gear 211 and second driven gear 212 in any known manner. Provisions for engaging clutch plates with driven gears are known in the art. In this exemplary embodiment, clutch plate 252 may engage adjacent gears through frictional contact. In some cases, the engaging surfaces of clutch plate 252, first driven gear 211 and second driven gear 212 may be configured for increasing friction during contact.

In other embodiments, a clutch plate and a driven gear set may include additional provisions for engaging the clutch plate with each of the driven gears. In an alternative embodiment, clutch plate 252 may include teeth for connecting to adjacent gears. For example, clutch plate 252 may include teeth on first side 261 and second side 262. In some cases, the teeth may be "dog teeth." First inner side 271 of first driven gear 211 and second inner side 272 of second driven gear 212 may also include holes that are configured to receive the teeth. This alternative arrangement may provide for a strong mechanical connection between clutch plate 252 and first driven gear 211 and second driven gear 212.

Clutch assembly 250 preferably includes provisions for automatically sliding clutch plate 252 along throttle shaft 104. In some embodiments, clutch assembly 250 may include spring 280. In some cases, spring 280 may be configured to wrap around throttle shaft 104. Preferably, first end 281 of spring 280 is disposed against second side 262 of clutch plate 252. Additionally, second end 282 of spring 280 is disposed against electromagnet 284 of clutch assembly 250. In particular, a portion of spring 280 may be disposed through second driven gear 212.

Spring 280 may be configured to change between an extended position and a contracted position. In some embodiments, spring 280 may be a compression spring. In this preferred embodiment, spring 280 may be configured with a rest length that is slightly larger than spacing S1 between electromagnet 284 and first inner side 271 of first driven gear 211. With this arrangement, spring 280 may press clutch plate 252 against first driven gear 211 under the restoring force of spring 280. In other words, first driven gear 211 may be engaged with clutch plate 252 in a default position of clutch assembly 250.

In some embodiments, electromagnet 284 may be configured to apply a force on clutch plate 252. In some cases, as electromagnet 284 applies a force on clutch plate 252, spring 280 may be contracted. In some cases, spring 280 may be contracted to a length that is substantially equal to or less than spacing S2 between electromagnet 284 and second inner side 272 of second driven gear 212. Using this arrangement, as spring 280 contracts, clutch plate 252 may be pulled against second inner side 272 of second driven gear 212. In other words, second driven gear 212 may be engaged with clutch plate 252 in an active position of clutch assembly 250.

Using this arrangement, clutch assembly 250 can be used to selectively engage first driven gear 211 or second driven gear 212 of gear train system 110. In particular, when electromagnet 284 is inactive, spring 280 provides a restoring force to clutch plate 252 that causes engagement between clutch plate 252 and first driven gear 211. If electromagnet 284 is activated by a control signal from ECU 120, for example, spring 280 is contracted and clutch plate 252 may engage second driven gear 212. Although the current embodiment includes an electromagnet to move clutch plate 252 to an active position, in other embodiments other mechanisms may be used to move clutch plate 252 to an active position. For example, in some cases, the movement of clutch plate 252 may be mechanically controlled using a motor of some kind. In still other cases, another clutch plate moving mechanism that is known in the art could be used.

This general arrangement for gear train system 110 and clutch assembly 250 provides for two distinct routes of power transfer. Furthermore, each distinct route is associated with a subset of gears that provide for a distinct gear ratio. By modifying the arrangement of gears in gear train system 110 and selecting between first driven gear 211 and second driven gear 212, the control of throttle valve 102 can be modified. In particular, gear train system 110 can be used to switch throttle valve control system 100 between a normal mode and a high accuracy mode. The normal mode may be preferably used during high engine load conditions. This high accuracy mode may provide for finer adjustment of throttle valve 102 during engine idle conditions. It should be understood, however, that this high accuracy mode is not limited to use during engine idle conditions. The high accuracy mode could also provide for an adjustment of a throttle valve during other engine operating conditions that may require fine tuning of the throttle.

Figure 3:
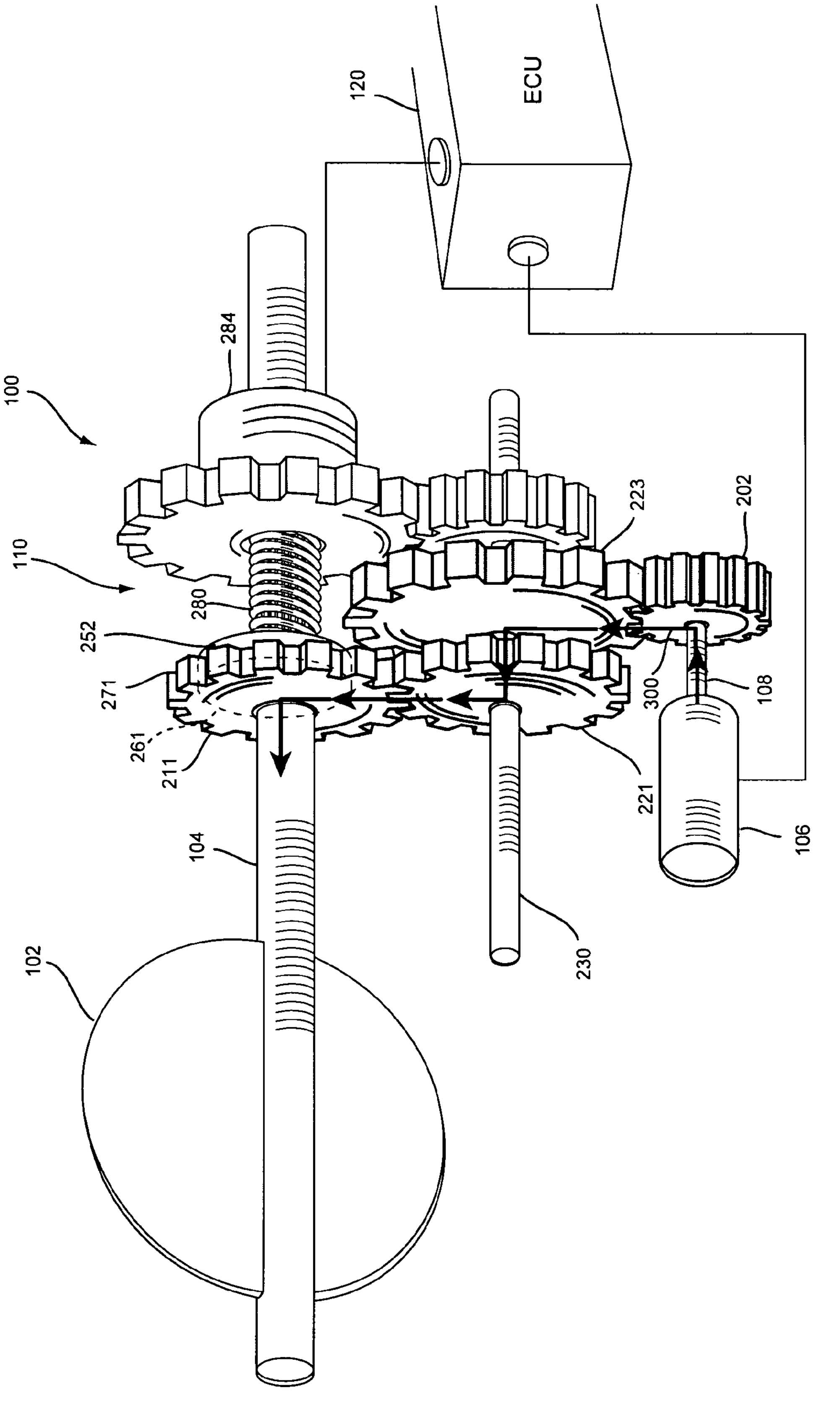
FIG. 3 is an isometric view of a preferred embodiment of a throttle valve control system operating in a normal mode.
Figure 4:
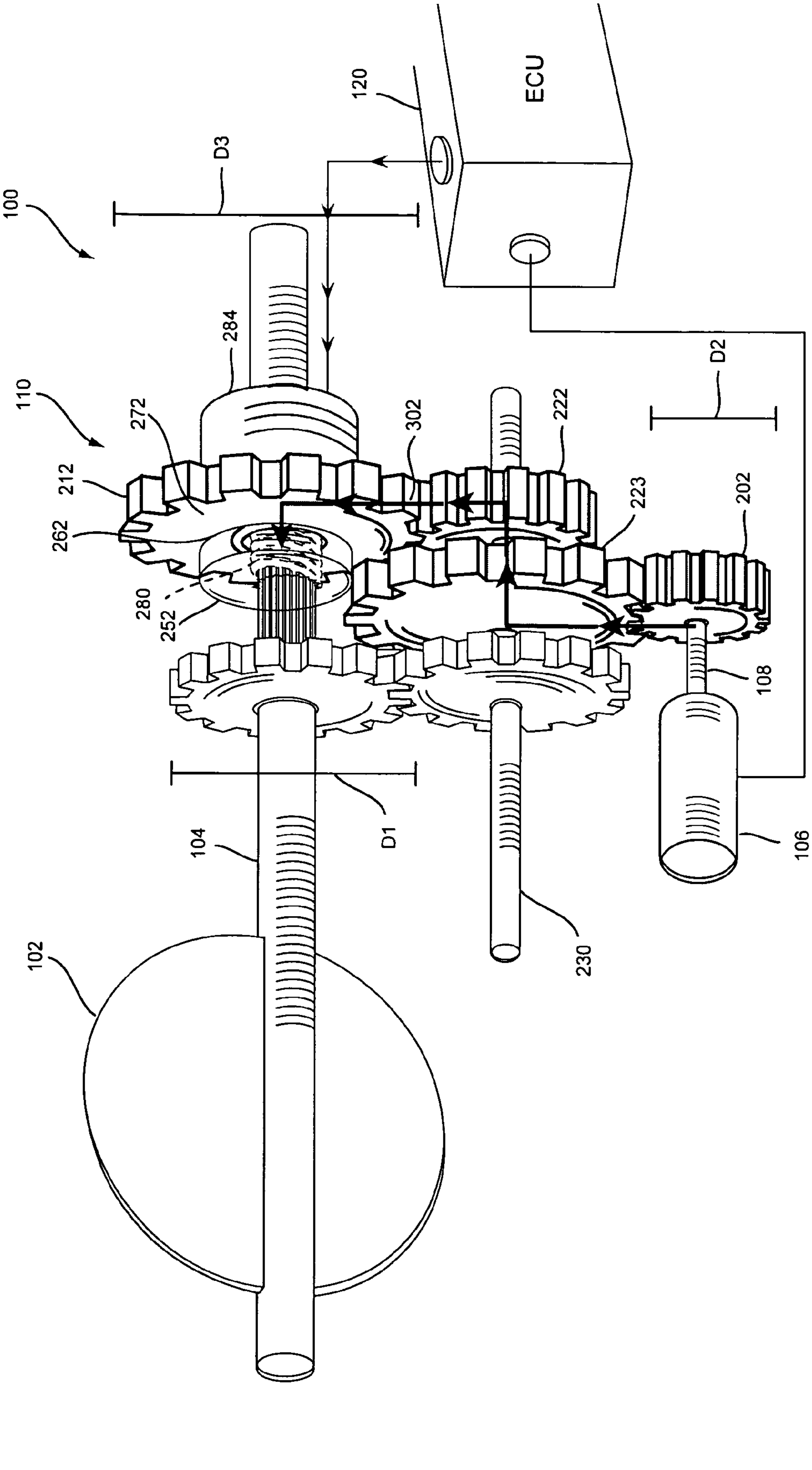
FIG. 4 is an isometric view of a preferred embodiment of a throttle valve control system operating in a high accuracy mode.

FIGS. 3 and 4 illustrate preferred embodiments of throttle valve control system 100 in a normal mode and a high accuracy mode, respectively. In both FIGS. 3 and 4, bold lines and arrows are used to indicate the path of power transfer between motor 106 and throttle valve 102.

Referring to FIG. 3, throttle valve control system 100 is in a normal mode. At this point, ECU 120 has received information related to engine operating conditions and determined that the engine is operating at a sufficiently high load. In particular, no control signal has been sent to activate electromagnet 284. Therefore, in this condition spring 280 remains in a default position. In this default position, the restoring force of spring 280 provides a mechanical connection between first side 261 of clutch plate 252 and first inner side 271 of first driven gear 211. In particular, clutch plate 252 and first driven gear 211 may be mechanically engaged through various provisions discussed previously.

With first driven gear 211 engaged with clutch plate 252 and throttle shaft 104, power may be transferred between motor 106 and throttle valve 102 along first gear path 300. In some embodiments, first gear path 300 may comprise driving gear 202, first intermediate gear 221, third intermediate gear 223 and first driven gear 211. Initially, power is transferred from motor 106 to motor shaft 108 in the form of rotational power. Driving gear 202 is also rotated with motor shaft 108. As driving gear 202 rotates, power is transferred to third intermediate gear 223, which serves as a driven gear for intermediate gear set 220. As third intermediate gear 223 rotates, power is transferred next to first intermediate gear 221 via intermediate shaft 230. Next, power is transferred from first intermediate gear 221 to first driven gear 211, which is selectively engaged with clutch plate 252 and throttle shaft 104. Finally, power is transferred to throttle valve 102 from throttle shaft 104. With this arrangement, as ECU 120 transfers control signals to motor 106, power generated by motor 106 may be used to operate throttle valve 102 during high load engine conditions.

Referring to FIG. 4, throttle valve control system 100 is in a high accuracy mode. At this point, ECU 120 has received information related to engine operating conditions and determined that the engine is operating in a condition that requires more precise control of the throttle. In some cases, the engine may be operating in an idle condition. Preferably, a control signal has been sent to activate electromagnet 284. Therefore, in this condition, spring 280 has moved to a contracted position. In this contracted position, the force of spring 280 provides a mechanical connection between second side 262 of clutch plate 252 and second inner side 272 of second driven gear 212. In particular, clutch plate 252 and second driven gear 212 may be mechanically engaged through various provisions discussed previously.

With second driven gear 212 engaged with clutch plate 252 and throttle shaft 104, power may be transferred between motor 106 and throttle valve 102 along second gear path 302. In some embodiments, second gear path 302 may comprise driving gear 202, second intermediate gear 222, third intermediate gear 223 and second driven gear 212. Initially, power is transferred from motor 106 to motor shaft 108 in the form of rotational power. Driving gear 202 is also rotated with motor shaft 108. As driving gear 202 rotates, power is transferred to third intermediate gear 223, which serves as a driven gear for intermediate gear set 220. As third intermediate gear 223 rotates, power is transferred next to second intermediate gear 222 via intermediate shaft 230. Following this, power is transferred from second intermediate gear 222 to second driven gear 212, which is selectively engaged with clutch plate 252 and throttle shaft 104. Finally, power is transferred to throttle valve 102 from throttle shaft 104. With this arrangement, as ECU 120 sends control signals to motor 106 for opening and closing throttle valve 102, power generated by motor 106 may be used to operate throttle valve 102 with high accuracy during engine conditions that require more precise control of the throttle, such as idle conditions.

Generally, each gear path may be associated with a particular gear ratio. First gear path 300 may be associated with a first gear ratio. Likewise, second gear path 302 may be associated with a second gear ratio. Generally, the first gear ratio and the second gear ratio may have any values. In some cases, first gear ratio and second gear ratio could have substantially similar values. In other cases, first gear ratio and second gear ratio could have substantially different values. In a preferred embodiment, the first gear ratio is larger than the second gear ratio. With this arrangement, the speed of throttle shaft 104 can be more carefully controlled when throttle valve control system 100 is in a high accuracy mode for engine conditions requiring more precise throttle control, such as idling.

In some embodiments, first gear path 300 could have a gear ratio between the ranges of 1 to 1 and 1 to 3. For example, in this preferred embodiment, first driven gear 211 may have a first diameter D1. Also, driving gear 202 may have a second diameter D2. In particular, in the preferred embodiment, first diameter D1 may be approximately twice the size of second diameter D2. This arrangement provides for a gear ratio of approximately 1 to 2. In other words, for every two rotations of driving gear 202, first driven gear 211 rotates once.

In some embodiments, second gear path 302 could have a gear ratio between the ranges of 1 to 1 and 1 to 5. For example, in this preferred embodiment, second driven gear 212 may have a third diameter D3. In particular, third diameter D3 may be approximately three times the size of second diameter D2 that is associated with driving gear 202. This arrangement provides for a gear ratio of 1 to 3. In other words, for every three rotations of driving gear 202, second driven gear 212 rotates once.

The gear ratio associated with each gear path is determined only by the diameters of the driving gear and the diameter of the driven gear for each path. In other words, the gear ratios are not affected by changing the diameters of the associated intermediate gears. However, it should be understood that the diameters of the intermediate gears may be adjusted, in some cases, in order to modify the distances between motor shaft 108 and throttle shaft 104.

Using a smaller gear ratio for a high accuracy mode of throttle valve control system 100 allows for increased control of throttle valve 102. At an engine condition requiring increased throttle precision, throttle valve 102 may be controlled to open to very small values to provide for more accurate control of airflow into the intake manifold. Furthermore, using a larger gear ratio for a normal mode of throttle valve control system 100 allows for quicker control of throttle valve 102 in high engine load conditions.

Figure 5:
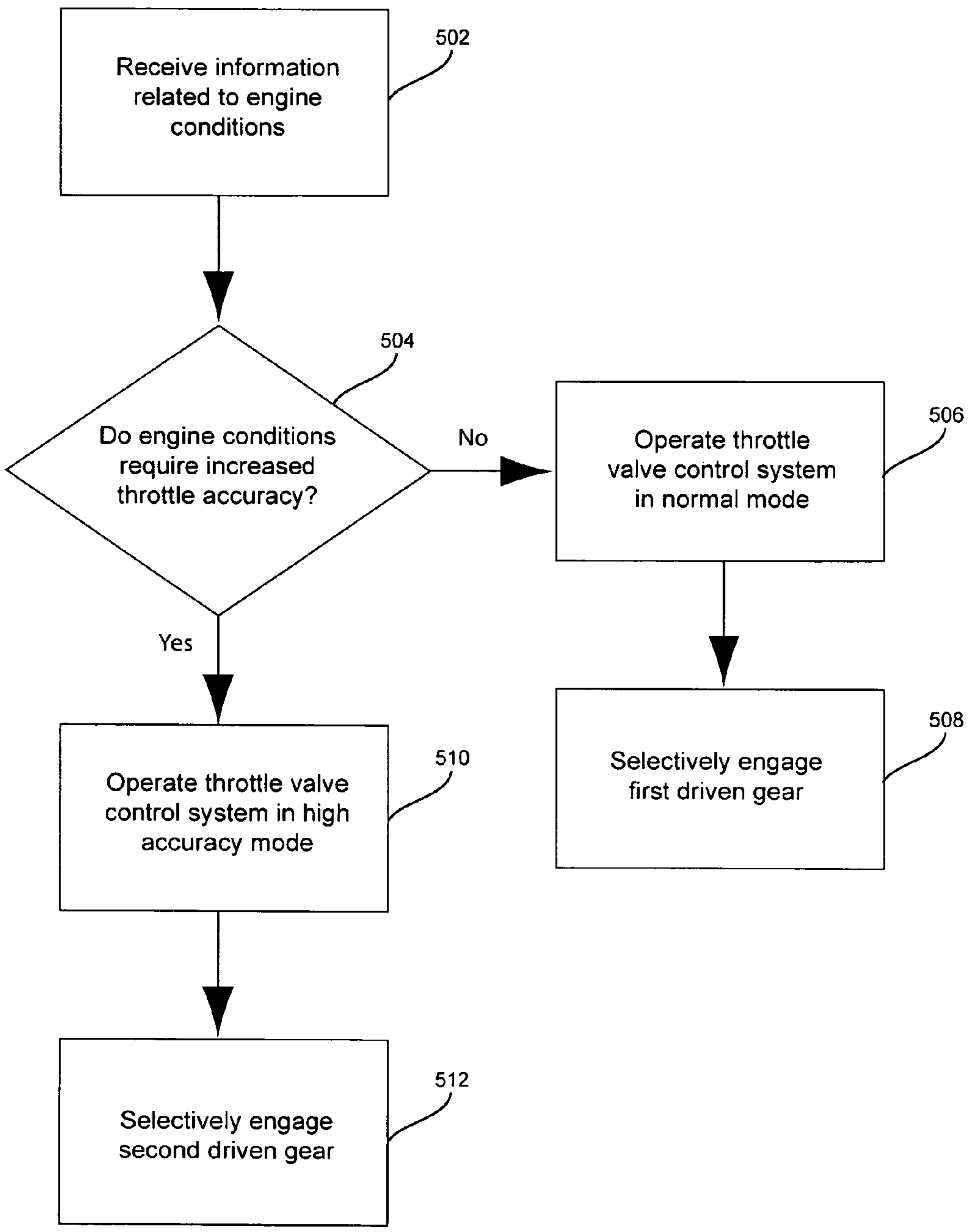
FIG. 5 is a preferred embodiment of a process for controlling a throttle valve control system.

FIG. 5 is a preferred embodiment of a process for controlling throttle valve control system 100. These steps are preferably used for switching between a normal mode and a high accuracy mode. The following steps are preferably performed by ECU 120; however, in other embodiments some steps may be performed by other devices or systems associated with a motor vehicle.

During first step 502, ECU 120 preferably receives information related to various engine parameters. Examples of different engine parameters have been previously discussed and include, but are not limited to, throttle pedal position, engine speed, engine temperature and intake manifold pressure. In some cases, these parameters may be determined from information received by one or more sensors. In other cases, these parameters may be calculated by ECU 120 according to one or more other parameters.

Following first step 502, ECU 120 preferably proceeds to second step 504. During second step 504, ECU 120 preferably determines if the current engine conditions require improved accuracy of the throttle. These conditions may be associated with predefined ranges of one or more engine parameters, such as engine speed, engine temperature, and intake manifold pressure, for example. For example, high accuracy control of the throttle may be required during idling conditions.

If, during second step 504, ECU 120 determines that the engine is not operating in a condition requiring improved accuracy of the throttle, ECU 120 preferably proceeds to third step 506. During third step 506, ECU 120 preferably controls throttle valve control system 100 in normal operating mode. At this point, ECU 120 may proceed to fourth step 508. During fourth step 508, ECU 120 may selectively engage first driven gear 211 using clutch plate 252.

Because a normal operating mode is associated with a default position of clutch plate 252, in some cases a control signal need not be sent to electromagnet 284. Instead, if throttle valve control system 100 is currently operating in a high accuracy mode, during fourth step 508 a control signal may be sent to deactivate electromagnet 284 and allow spring 280 and clutch plate 252 to return to a default position.

If, during second step 504, ECU 120 determines that the engine is operating in idle conditions, ECU 120 may proceed to fifth step 510. During fifth step 510, ECU 120 preferably controls throttle valve control system 100 in a high accuracy mode. At this point, ECU 120 may proceed to sixth step 512. During sixth step 512, ECU 120 preferably selectively engages second driven gear 212. In a preferred embodiment, this may be achieved by sending a control signal to activate electromagnet 284. This allows spring 280 to contract and further allows clutch plate 252 to engage second driven gear 212.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A throttle valve control system, comprising:

a motor attached to a motor shaft and configured to rotate the motor shaft;

a driving gear engaged with the motor shaft;

an intermediate gear set configured to engage the driving gear configured to rotate about an intermediate shaft;

a first driven gear engaging the intermediate gear set and a second driven gear engaging the intermediate gear set; and wherein a throttle shaft attached to a throttle valve is selectively engaged with either the first driven gear or the second driven gear.

2. The throttle valve control system according to claim 1, wherein the driving gear, the first driven gear and at least one gear from the intermediate gear set are associated with a first gear path configured to transfer power between the motor shaft and the throttle shaft.

3. The throttle valve control system according to claim 2, wherein the first gear path is associated with a first gear ratio.

4. The throttle valve control system according to claim 3, wherein the driving gear, the second driven gear and at least one gear from the intermediate gear set are associated with a second gear path configured to transfer power between the motor shaft and the throttle shaft.

5. The throttle valve control system according to claim 4, wherein the second gear path is associated with a second gear ratio.

6. The throttle valve control system according to claim 5, wherein the first gear ratio is greater than the second gear ratio.

7. The throttle valve control system according to claim 1, wherein the first driven gear is selectively engaged with the throttle shaft when the throttle valve control system is operating in a normal mode associated with high engine load conditions.

8. The throttle valve control system according to claim 7, wherein the second driven gear is selectively engaged with the throttle shaft when the throttle valve is operating in a high accuracy mode.

9. The throttle valve control system according to claim 8, wherein the selective engagement with either the first driven gear or the second driven gear is achieved using a clutch plate.

10. The throttle valve control system according to claim 9, wherein the clutch plate is configured to slide along the throttle shaft between the first driven gear and the second driven gear.

11. The throttle valve control system according to claim 10, wherein the movement of the clutch plate is accomplished using a spring and an electromagnet.

12. The throttle valve control system according to claim 11, wherein the clutch plate is engaged with the first driven gear when the spring is in a default position and the electromagnet is inactive.

13. The throttle valve control system according to claim 12, wherein the clutch plate is engaged with the second driven gear when the spring is in an engaged position and the electromagnet is active.

14. A throttle valve control system, comprising:

a motor attached to a motor shaft and configured to rotate the motor shaft;

a driving gear engaged with the motor shaft;

an intermediate gear set configured to engage the driving gear and configured to rotate about an intermediate shaft;

a first driven gear and a second driven gear that are engaged with the intermediate gear set and that may be selectively engaged with a throttle shaft, the throttle shaft being configured to rotate a throttle valve; and wherein the intermediate gear set comprises a first intermediate gear configured to engage with the first driven gear, a second intermediate gear configured to engage with the second driven gear and a third intermediate gear configured to engage with the driving gear.

15. The throttle valve control system according to claim 14, wherein the first intermediate gear has a first diameter that is smaller than a second diameter of the second intermediate gear.

16. The throttle valve control system according to claim 15, wherein the third intermediate gear has a third diameter that is larger than the first diameter of the first intermediate gear and the second diameter of the second intermediate gear.

17. The throttle valve control system according to claim 14, wherein the first driven gear has a first diameter that is greater than a second diameter of the second driven gear.

18. A method of operating a throttle valve control system, comprising the steps of:

receiving information related to engine conditions;

determining if an engine is operating in a condition that requires precise control of a throttle;

selectively engaging a first driven gear if the engine is operating in a normal condition; and selectively engaging a second driven gear if the engine is operating in the condition that requires precise control of the throttle.

19. The method according to claim 18, wherein the step of engaging the second driven gear further includes the step of activating an electromagnet to move a clutch plate.

20. The method according to claim 19, wherein the first driven gear is engaged by the clutch whenever the electromagnet is not activated.

* * * * *